United States Patent [19]
Hunt et al.

[11] Patent Number: 6,034,158
[45] Date of Patent: Mar. 7, 2000

[54] EMULSIFIED POLY(OXYALKYLENATED) COLORANTS FOR WAX COMPOSITIONS

[75] Inventors: Michael O. Hunt, Wilmington, Del.; John D. Bruhnke, Spartanburg, S.C.

[73] Assignee: Milliken & Company, Spartanburg, S.C.

[21] Appl. No.: 09/281,051

[22] Filed: Mar. 30, 1999

Related U.S. Application Data

[63] Continuation-in-part of application No. 09/110,722, Jul. 7, 1998, abandoned.

[51] Int. Cl.[7] .............................. C08L 91/06; C08L 91/08; C08K 5/103; C08K 5/053
[52] U.S. Cl. ..................... 524/275; 524/277; 524/279; 524/315; 524/317; 524/478; 524/479; 524/480; 524/487; 524/488; 524/489
[58] Field of Search ..................................... 524/275, 277, 524/279, 315, 317, 478, 479, 482, 487, 488, 489

[56] References Cited

U.S. PATENT DOCUMENTS

| | | | |
|---|---|---|---|
| 4,167,510 | 9/1979 | Brendle | 534/729 |
| 4,284,729 | 8/1981 | Cross et al. | 521/158 |
| 4,507,407 | 3/1985 | Kluger et al. | 521/158 |
| 4,751,254 | 6/1988 | Kluger et al. | 521/163 |
| 4,846,846 | 7/1989 | Rekers et al. | 8/515 |
| 4,871,371 | 10/1989 | Harris | 8/403 |

*Primary Examiner*—Peter A. Szekely
*Attorney, Agent, or Firm*—Terry T. Moyer; William S. Parks

[57] ABSTRACT

This invention relates to a dispersions of polymeric colorants having poly(oxyalkylene) moieties mixed with unsubstituted sorbitan monooleate alone or ethoxylated dodecanol admixed with unsubstituted sorbitan monooleate. Such colorant dispersions are easy to handle and are effectively introduced into wax media, thereby providing significant improvements over other dyestuffs, pigments, and colorants.

18 Claims, No Drawings

EMULSIFIED POLY(OXYALKYLENATED) COLORANTS FOR WAX COMPOSITIONS

CROSS-REFERENCE TO RELATED APPLICATION

This application is a continuation-in-part of co-pending application of U.S. patent application Ser. No. 09/110,722, now abandoned, filed on Jul. 7, 1998, of Michael O. Hunt et al. for Emulsified Poly(oxyalkylenated) Colorants for Wax Compositions. This application is incorporated herein by reference.

FIELD OF THE INVENTION

This invention relates to a dispersion of polymeric colorants having poly(oxyalkylene) moieties mixed with unsubstituted sorbitan monooleate alone or ethoxylated dodecanol admixed with unsubstituted sorbitan monooleate. Such colorant dispersions are easy to handle and are effectively introduced into wax media, thereby providing significant improvements over other dyestuffs, pigments, and colorants.

BACKGROUND OF THE PRIOR ART

Poly(oxyalkylene) polymeric colorants have been utilized to permanently color myriad substrates, including thermoplastic resins, such as U.S. Pat. No. 4,284,729, to Cross et al., U.S. Pat. No. 4,507,407, to Kluger et al., and U.S. Pat. No. 4,751,254, to Kluger et al.; polyurethane foams, such as U.S. Pat. No. 4,846,846, to Rekers et al.; aqueous and non-aqueous liquids, such as U.S. Pat. No. 4,871,371, to Harris; and have been used as fugitive tints for textiles and threads, such as U.S. Pat. No. 4,167,510, to Brendle. Such colorants provide effective and stable colorations to such surfaces, are easily handled, and exhibit low degrees of staining due to their high solubility in water.

It has proven very difficult, however, to incorporate such beneficially performing colorants into wax compositions, particularly within candles, crayons, and other similar large-scale wax articles. Such colorants alone do not thoroughly disperse within waxes and therefore produce displeasing, non-homogeneous color effects. Nowhere within the prior art is there a teaching or fair suggestion as to how such problems can be remedied. As a result, there still exists a need for providing the benefits of polyoxyalkylenated polymeric colorants within wax compositions.

OBJECTS OF THE INVENTION

Therefore, an object of the invention is to provide a polyoxyalkylenated colorant composition which effectively, thoroughly, and homogeneously colors waxes. Another object of the invention is to provide an easily handled emulsified polyoxyalkylenated colorant composition for introduction within wax formulations. Additionally, it is an object of this invention to provide an emulsified polyoxyalkylenated wax colorant composition which performs at the optimum coloring level within such media. Furthermore, it is a further object of the invention to provide a method for effectively, thoroughly, and homogeneously coloring wax formulations.

DETAILED DESCRIPTION OF THE INVENTION

Accordingly, the present invention is a colored wax composition comprising
a wax;
a polyoxyalkylenated colorant defined by the Formula (I)

$$R\{A\text{-}[(\text{alkyleneoxy constituent})_n H]_m\}_x \qquad (I)$$

wherein
R is an organic chromophore;
A is a linking moiety in said chromophore selected from the group consisting of N, O, S, or $CO_2$;
Alkyleneoxy constituent contains from 2 to 4 carbon atoms;
n is an integer of from 2 to about 100;
m is 1 when A is O, S, or $CO_2$, and m is 2 when A is N;
x is an integer of from 1 to about 5; and
a surfactant selected from the group consisting of unsubstituted sorbitan monooleate and an admixture of unsubstituted sorbitan monooleate and ethoxylated dodecanol.

Additionally, a method for coloring a wax composition is provided comprising the sequential steps of
(a) providing a solution of molten wax;
(b) providing a colorant emulsion comprising a colorant defined by Formula (I)

$$R\{A[\text{-alkyleneoxy constituent})_n H]_m\}_x \qquad (I)$$

wherein
R is an organic chromophore;
A is a linking moiety in said chromophore selected from the group consisting of N, O, S, or $CO_2$;
Alkyleneoxy constituent contains from 2 to 4 carbon atoms;
n is an integer of from 2 to about 100;
m is 1 when A is O, S, or $CO_2$, and m is 2 when A is N;
x is an integer of from 1 to about 5; and
a surfactant formulation selected from the group consisting of unsubstituted sorbitan monooleate and sorbitan monooleate admixed with ethoxylated dodecanol;
(c) introducing said emulsion into said molten wax solution to produce a colored wax composition;
(d) pouring said colored wax composition into a mold; and
(e) allowing sufficient time for said colored wax composition to cool within said mold.

The colorants are generally the same as those disclosed within the prior patents listed above. The organic chromophore (R) is, more specifically, one or more of the following types of compounds: azo, diazo, disazo, trisazo, diphenylmethane, triphenylmethane, xanthane, nitro, nitroso, acridine, methine, indamine, thiazole, oxazine, or anthraquinone. Preferably, R is one or more of nitro, triphenylmethane, methine, or thiazole based compounds. Group A is present on group R and is utilized to attach the polyoxyalkylene constituent to the organic chromophore. Nitrogen is the preferred linking moiety. The polyoxyalkylene group is generally a combination of ethylene oxide and propylene oxide monomers. Preferably propylene oxide is present in the major amount, and most preferably the entire polyoxyalkylene constituent is propylene oxide. The preferred number of moles of polyoxyalkylene constituent per alcohol (i.e., hydrogen-capped) chain is from 2 to 15 (n would therefore preferably be from 4 to 30), more preferably from 4 to 10 (n would most preferably be from 8 to 20). Also, preferably two such polyoxyalkylene alcohol chains are present on each polymeric colorant compound (x, above, is preferably 2). The colorants utilized within the present invention are generally liquid at ambient conditions of temperature and pressure. However, if they are not liquid under such conditions they are still generally dispersable within the specific emulsifiers and thus, ultimately within the wax formulations in order to produce the inventive colored wax compositions.

Particularly preferred colorants, and thus merely examples of the polyoxyalkylene polymeric colorant of this invention, include the following:

TABLE 1

Preferred Poly(oxyalkylenated) Colorants

| Ex. # | Chromophore | Moles EO | Moles PO | Group A |
|-------|----------------|----------|----------|---------|
| 1 | Triphenylmethane | 10 | 10 | N |
| 2 | Anthraquinone | 4 | 2 | N |
| 3 | Benzothiazole | 8 | 10 | N |
| 4 | Methine | 7 | 15 | N |
| 5 | Thiazo | 10 | 14 | N |
| 6 | Bisazo | 16 | 20 | N |

The term wax is intended to encompass any wax or wax-like substance in which the utilized polyoxyalkylenated polymeric colorants alone are substantially insoluble. Waxes are generally defined as saturated fatty (high molecular weight) hydrocarbons. More specific types of such waxes include mineral waxes, such as paraffin, montan, ozokerite, microcrystalline, earth, and the like; animal waxes, such as beeswax, waspwax, Chinesewax (insectwax), and the like; vegetable waxes, such as carnauba, sugarcane wax, candelilla, flax wax, and the like; and synthetic waxes, such as Fischer-Tropsch wax, polyethylene wax, and the like. Wax compositions can be molded into different articles such as candles and crayons (with the addition of sufficient amounts of suitable plasticizers, such as stearic acid), ear plugs, and the like.

The specific surfactants have proven to be the only emulsifiers which provide the necessary degree of dispersability (and thus solubility) for the polyoxyalkylenated polymeric colorants within the target wax formulations. It has thus been realized that unsubstituted sorbitan monooleate (that is, there are no extra moieties present on the surfactant, such as alkoxylates, alkyls, alkylenes, and any other groups), available from Imperial Chemical Industries under the tradename Span 80®, performs, as the sole emulsifying agent, at a level well above any other type of individual surfactant. Furthermore, this unsubstituted species in combination with ethoxylated dodecanol (4 EO), such as the surfactant sold under the tradename Synfac™ DG, available from Milliken & Company, provides the same beneficial level of performance as the sorbitan monooleate alone. Preferably, the emulsifier is present in amounts of from about 50 to about 99 parts (out of one hundred) of the entire colorant emulsion (thus the colorant is present in amounts of from about 1 to about 50 parts). Preferably, the surfactant is present in amounts from about 70 to about 95 parts per hundred, more preferably from about 80 to about 92, and most preferably from about 81 to about 91. Within the two surfactant formulation, generally the sorbitan monooleate is present in major amounts. Preferably the sorbitan monooleate is present in amounts from about 51 to about 98 parts per hundred (of the total colorant composition) while the ethoxylated dodecanol is present in amounts from about 1 to about 49 parts; more preferably the sorbitan is present in amounts from about 74 to about 90 parts and the dodecanol from about 1 to about 18 parts. Furthermore, the colorant is present in amounts from about 3 to about 19 parts per hundred.

The colorant dispersion (emulsion) is generally added in an amount of from about 0.01 to about 0.5% by weight of the target wax formulation. With greater proportions of colorant emulsion being added, the resultant wax composition (or article) obtains a deeper shade of color.

PREFERRED EMBODIMENTS OF THE INVENTION

Examples of particularly preferred dispersions and colored wax compositions within the scope of the present invention are set forth below.

POLYMERIC COLORANT DISPERSIONS

EXAMPLE 7

3.8 parts of the undiluted colorant of Example 1 in Table 1, above, was mixed with 16.0 parts of ethoxylated dodecanol (available from Milliken Chemical as Synfac™ DG) and 80.2 parts of sorbitan monooleate (available from Imperial Chemical as Span 80®). The resulting mixture was a viscous, blue-colored, homogeneous solution.

EXAMPLE 8

3.5 parts of the undiluted colorant of the colorant in Example 1, above, was mixed with 11.5 parts of ethoxylated dodecanol and 85.0 parts of sorbitan monooleate. The resulting mixture was a viscous, blue-colored, homogeneous solution.

EXAMPLE 9

10.5 parts of the undiluted polyoxyalkylenated polymeric colorant of Example 3, above, was mixed with 14.9 parts of ethoxylated dodecanol and 74.6 parts of sorbitan monooleate. The resulting mixture was a viscous, red-colored, homogeneous solution.

EXAMPLE 10

9.0 parts of the undiluted colorant of Example 3, above, was mixed with 18.0 parts of ethoxylated dodecanol and 73.0 parts of sorbitan monooleate. The resulting mixture was a viscous, red-colored, homogeneous solution.

EXAMPLE 11

18.9 parts of the undiluted polyoxyalkylenated polymeric colorant of Example 4, above, was mixed with 81.1 parts of sorbitan monooleate. The resulting mixture was a viscous, yellow-colored, homogeneous solution.

EXAMPLE 12

12.0 parts of the undiluted colorant of Example 4, above, was mixed with 1.0 part of ethoxylated dodecanol and 87.0 parts of sorbitan monooleate. The resulting mixture was a viscous, yellow-colored, homogeneous solution.

EXAMPLE 13

9.0 parts of the undiluted polyoxyalkylenated polymeric colorant of Example 6,5, above, was mixed with 1.0 part of ethoxylated dodecanol and 76.0 parts of sorbitan monooleate. The resulting mixture was a viscous, violet-colored, homogeneous solution.

COLORED WA COMPOSITIONS

Generally, a colorant (or blend of colorants) was added to molten wax and stirred (while the solution remained in a molten state) until the wax solution became an homogeneously colored formulation. This was allowed to cool and form a colored solid.

EXAMPLE 14

The dispersion of EXAMPLE 7 was introduced into a molten paraffin wax formulation (melting point 130–150° F.) in an amount of about 2.1% by weight. Upon stirring, the composition became a thorough homogeneous medium blue shade. The composition was then poured into a candle mold and allowed to cool. The resultant candle exhibited excellent colorations.

EXAMPLE 15

The dispersion of EXAMPLE 8 was introduced into a molten paraffin wax formulation (melting point 130–150° F.) in an amount of about 2.3% by weight. Upon stirring, the composition became a thorough homogeneous medium blue shade. The composition was then poured into a candle mold and allowed to cool. The resultant candle exhibited excellent colorations.

EXAMPLE 16

The dispersion of EXAMPLE 9 was introduced into a molten paraffin wax formulation(melting point 130–150° F.) in an amount of about 0.9% by weight. Upon stirring, the composition became a thorough homogeneous medium red shade. The composition was then poured into a candle mold and allowed to cool. The resultant candle exhibited excellent colorations.

EXAMPLE 17

The dispersion of EXAMPLE 10 was introduced into a molten paraffin wax formulation(melting point 130–150° F.) in an amount of about 1.0% by weight. Upon stirring, the composition became a thorough homogeneous medium red shade. The composition was then poured into a candle mold and allowed to cool. The resultant candle exhibited excellent colorations.

EXAMPLE 18

The dispersion of EXAMPLE 11 was introduced into a molten paraffin wax formulation(melting point 130–150° F.) in an amount of about 0.5% by weight. Upon stirring, the composition became a thorough homogeneous medium yellow shade. The composition was then poured into a candle mold and allowed to cool. The resultant candle exhibited excellent colorations.

EXAMPLE 19

The dispersion of EXAMPLE 12 was introduced into a molten paraffin wax formulation(melting point 130–150° F.) in an amount of about 0.8% by weight. Upon stirring, the composition became a thorough homogeneous medium yellow shade. The composition was then poured into a candle mold and allowed to cool. The resultant candle exhibited excellent colorations.

EXAMPLE 20

The dispersion of EXAMPLE 13 was introduced into a molten paraffin wax formulation(melting point 130–150° F.) in an amount of about 1.0% by weight. Upon stirring, the composition became a thorough homogeneous medium yellow shade. The composition was then poured into a candle mold and allowed to cool. The resultant candle exhibited excellent colorations.

COMPARATIVE EXAMPLES

Emulsions comprising the same colorants as in the present invention but utilizing different but similar surfactants (in structure) to those within the present invention were then tested. Their performance as colorants were measured at two different times. First, the resultant emulsion as added to the wax within the mixing vessel was viewed. Second, the resultant molded wax article was viewed. Both measurements were made empirically since the exhibited coloring deficiencies were clear. The following table indicates the surfactants present and the measured deficiencies viewed. The same method for preparing the emulsion (3.8 parts of colorant, 16.0 parts of Synfac™ DG surfactant, and 80.2 parts of other surfactant, all added in an amount of about 2.1% by weight of the wax) as well as producing a molded wax article were followed as for the inventive examples, above.

TABLE 2

| | Colorant | | Performance Results | |
| --- | --- | --- | --- | --- |
| Ex. | (from above) | Surfactant (description) | Mixing Vessel | Molded Wax Article |
| 21 | Example 1 | Ethoxylated Sorbitan Monooleate (5EO) | Residual wax had large colorant droplets | Majority of colorant present at the bottom of the article |
| 22 | Example 3 | Ethoxylated Sorbitan Monooleate (5EO) | Residual wax had large colorant droplets | Majority of colorant present at the bottom of the article |
| 23 | Example 4 | Ethoxylated Sorbitan Monooleate (5EO) | Residual wax had large colorant droplets | Majority of colorant present at the bottom of the article |
| 24 | Example 5 | Ethoxylated Sorbitan Monooleate (5EO) | Residual wax had large colorant droplets | Majority of colorant present at the bottom of the article |
| 25 | Example 1 | Sorbitan Trioleate | Residual wax contained small colorant particles | Very low color levels; indicates poor dispersion |

TABLE 2-continued

| | Colorant | | Performance Results | |
|---|---|---|---|---|
| Ex. | (from above) | Surfactant (description) | Mixing Vessel | Molded Wax Article |
| 26 | Example 3 | Sorbitan Trioleate | Residual wax contained small colorant particles | Very low color levels; indicates poor dispersion |
| 27 | Example 4 | Sorbitan Trioleate | Residual wax contained small colorant particles | Very low color levels; indicates poor dispersion |
| 28 | Example 5 | Sorbitan Trioleate | Residual wax contained small colorant particles | Very low color levels; indicates poor dispersion |
| 29 | Example 1 | Sorbitan Monolaurate | Residual wax contained colorant droplets | Majority of colorant at bottom of article |
| 30 | Example 3 | Sorbitan Monolaurate | Residual wax contained colorant droplets | Majority of colorant at bottom of article |
| 31 | Example 4 | Sorbitan Monolaurate | Residual wax contained colorant droplets | Majority of colorant at bottom of article |
| 32 | Example 1 | Sorbitan Hexaoleate | Residual wax contained a large amount of colorant droplets | Very low color levels; majority of colorant at bottom of article |
| 33 | Example 3 | Sorbitan Hexaoleate | Residual wax contained a large amount of colorant droplets | Very low color levels; majority of colorant at bottom of article |
| 34 | Example 4 | Sorbitan Hexaoleate | Residual wax contained a large amount of colorant droplets | Very low color levels; majority of colorant at bottom of article |
| 35 | Example 5 | Sorbitan Hexaoleate | Residual wax contained a large amount of colorant droplets | Very low color levels; majority of colorant at bottom of article |

Clearly, the performance of substituted sorbitan monooleate and/or sorbitan polyester surfactants exhibited deleterious effects on the colorability and dispersability of the poloxyalkylene polymeric colorant emulsions within waxes.

Lastly, a non-sorbitan ester surfactant was tested alone, without an ethoxylated dodecanol present, for its dispersability of the polyoxyalkylene colorants and subsequent colorability within waes. 17 parts per hundred of colorant used in combination with 83 parts of glyceryl monooleate/dioleate. The results are tabulated as follows:

TABLE 3

| | Colorant | Performance Results | |
|---|---|---|---|
| Ex. | (from above) | Mixing Vessel | Molded Article |
| 36 | Example 1 | Residual wax contained small colorant droplets | Poor dispersion with majority of colorant at bottom of article |
| 37 | Example 3 | Residual wax contained small colorant droplets | Poor dispersion with majority of colorant at bottom of article |
| 38 | Example 4 | Residual wax contained small colorant droplets | Poor dispersion with majority of colorant at bottom of article |
| 39 | Example 5 | Residual wax contained small colorant droplets at bottom of article | Poor dispersion with majority of colorant |

Again, clearly the sorbitan monooleate alone provides superior performance than with a non-sorbitan ester surfactant.

Having described the invention in detail it is obvious that one skilled in the art will be able to make variations and modifications thereto without departing from the scope of the present invention. Accordingly, the scope of the present invention should be determined only by the claims appended hereto.

That which is claimed is:

1. A colored wax composition comprising a wax;

a polyoxyalkylenated colorant defined by the Formula (I)

$$R\{A\text{-}[(\text{alkyleneoxy constituent})_nH]_m\}_x \qquad (I)$$

wherein

R is an organic chromophore;

A is a linking moiety in said chromophore selected from the group consisting of N, O, S, or $CO_2$;

Alkyleneoxy constituent contains from 2 to 4 carbon atoms;

n is an integer of from 2 to about 100;

m is 1 when A is O, S, or $CO_2$, and m is 2 when A is N;

x is an integer of from 1 to about 5; and a surfactant selected from the group consisting of unsubstituted sorbitan monooleate and an admixture of unsubstituted sorbitan monooleate and ethoxylated dodecanol.

2. The wax composition in claim 1 wherein said wax is selected from the group consisting of mineral waxes, animal waxes, vegetable waxes, synthetic waxes, and any mixtures thereof.

3. The wax composition in claim 2 wherein said wax is selected from the group consisting of paraffin wax, montan wax, ozokerite wax, microcrystalline wax, earth wax, beeswax, waspwax, Chinesewax (insectwax), carnauba wax, sugarcane wax, candelilla wax, flax wax, Fischer-Tropsch wax, and any mixtures thereof.

4. The wax composition in claim 3 wherein said wax is paraffin wax.

5. The wax composition in claim 1 wherein

R is selected from the group consisting of azo, diazo, disazo, trisazo, diphenylmethane, triphenylmethane, xanthane, nitro, nitroso, acridine, methine, indamine, thiazole, oxazine, anthraquinone, and any mixtures thereof;

Alkyleneoxy constituent comprises a mixture of ethyleneoxy and propyleneoxy groups;

n is from about 4 to about 30; and x is 2.

6. The wax composition in claim 5 wherein

R is selected from the group consisting of azo, triphenylmethane, nitro, thiazole, and any mixtures thereof;

Alkyleneoxy constituent comprises from about 0 to about 50% ethyleneoxy groups and from about 50 to about 100% propyleneoxy groups; and n is from about 8 to about 20.

7. The wax composition in claim 6 wherein

Alkyleneoxy constituent comprises from about 0 to about 40% ethyleneoxy groups and from about 60 to about 100% propyleneoxy groups.

8. The wax composition in claim 7 wherein Alkyleneoxy constituent comprises 100% propyleneoxy groups.

9. A method for producing a colored wax composition comprising the sequential steps of (a) providing a solution of molten wax;

(b) providing a colorant emulsion comprising a colorant defined by Formula (I)

$$R\{A[\text{-alkyleneoxy constituent})_n H]_m\}_x \qquad (I)$$

wherein

R is an organic chromophore;

A is a linking moiety in said chromophore selected from the group consisting of N, O, S, or $CO_2$;

Alkyleneoxy constituent contains from 2 to 4 carbon atoms;

n is an integer of from 2 to about 100;

m is 1 when A is O, S, or $CO_2$, and m is 2 when A is N;

x is an integer of from 1 to about 5; and a surfactant formulation selected from the group consisting of unsubstituted sorbitan monooleate and sorbitan monooleate admixed with ethoxylated dodecanol;

(c) introducing said emulsion into said molten wax solution to produce a colored wax composition;

(d) optionally pouring said colored wax composition into a mold; and (e) optionally allowing sufficient time for said colored wax composition to cool within said mold.

10. The method of claim 9 wherein said wax is selected from the group consisting of mineral waxes, animal waxes, vegetable waxes, synthetic waxes, and any mixtures thereof.

11. The method of claim 10 wherein said wax is selected from the group consisting of paraffin wax, montan wax, ozokerite wax, microcrystalline wax, earth wax, beeswax, waspwax, Chinesewax (insectwax), carnauba wax, sugarcane wax, candelilla wax, flax wax, Fischer-Tropsch wax, and any mixtures thereof.

12. The method of claim 11 wherein said wax is paraffin wax.

13. The method of claim 9 wherein

R is selected from the group consisting of azo, diazo, disazo, trisazo, diphenylmethane, triphenylmethane, xanthane, nitro, nitroso, acridine, methine, indamine, thiazole, oxazine, anthraquinone, and any mixtures thereof; and Alkyleneoxy constituent comprises a mixture of ethyleneoxy and propyleneoxy groups.

14. The method of claim 13 wherein

R is selected from the group consisting of azo, triphenylmethane, nitro, thiazole, and any mixtures thereof.

15. A colorant emulsion for coloring waxes comprising a colorant defined by Formula (I)

$$R\{A[\text{-alkyleneoxy constituent})_n H]_m\}_x \qquad (I)$$

wherein

R is an organic chromophore;

A is a linking moiety in said chromophore selected from the group consisting of N, O, S, or $CO_2$;

Alkyleneoxy constituent contains from 2 to 4 carbon atoms;

n is an integer of from 2 to about 100;

m is 1 when A is O, S, or $CO_2$, and m is 0 when A is N;

x is an integer of from 1 to about 5; and a surfactant formulation selected from the group consisting of unsubstituted sorbitan monooleate and sorbitan monooleate admixed with ethoxylated dodecanol.

16. The colorant emulsion of claim 15 wherein

R is selected from the group consisting of azo, diazo, disazo, trisazo, diphenylmethane, triphenylmethane, xanthane, nitro, nitroso, acridine, methine, indamine, thiazole, oxazine, anthraquinone, and any mixtures thereof; and Alkyleneoxy constituent comprises a mixture of ethyleneoxy and propyleneoxy groups.

17. The colorant emulsion of claim 16 wherein

R is selected from the group consisting of azo, triphenylmethane, nitro, thiazole, and any mixtures thereof.

18. The colorant emulsion of claim 17 wherein said colorant is present in an amount of from about 3 to about 19 parts per hundred;

said unsubstituted monooleate surfactant is present in an amount of from about 74 to about 90 parts per hundred; and said ethoxylated dodecanol is present in an amount of from about 0 to about 18 parts per hundred.

* * * * *